United States Patent [19]
Hao et al.

[11] Patent Number: 5,816,890
[45] Date of Patent: Oct. 6, 1998

[54] ELECTRICAL LAP GUIDE WIRING CONFIGURATION

[75] Inventors: Shanlin X. Hao, St. Paul; Lance E. Stover, Eden Prairie; Beat G. Keel, Prior Lake, all of Minn.

[73] Assignee: Seagate Technology, Inc., Scotts Valley, Calif.

[21] Appl. No.: 793,718

[22] PCT Filed: Jan. 30, 1997

[86] PCT No.: PCT/US97/01324

§ 371 Date: Mar. 3, 1997

§ 102(e) Date: Mar. 3, 1997

[87] PCT Pub. No.: WO98/18596

PCT Pub. Date: May 7, 1998

Related U.S. Application Data

[60] Provisional application No. 60/029,327 Oct. 29, 1996.

[51] Int. Cl.[6] .............................. B24B 49/02; G11B 5/127
[52] U.S. Cl. .................................. 451/5; 451/1; 29/603.1
[58] Field of Search .................................. 29/593, 603.01, 29/603.09, 603.19, 603.1; 451/1, 5, 8; 324/252; 360/113, 122

[56] References Cited

U.S. PATENT DOCUMENTS

| | | |
|---|---|---|
| 4,457,114 | 7/1984 | Hennenfent et al. . |
| 4,477,968 | 10/1984 | Kracke et al. . |
| 4,536,992 | 8/1985 | Hennenfent et al. . |
| 4,559,743 | 12/1985 | Kracke et al. . |
| 4,675,986 | 6/1987 | Yen . |
| 4,689,877 | 9/1987 | Church ........................................ 451/1 |
| 4,912,883 | 4/1990 | Chang et al. ............................... 451/1 |
| 4,914,868 | 4/1990 | Church et al. .............................. 451/5 |
| 5,023,991 | 6/1991 | Smith ........................................ 451/1 |
| 5,175,938 | 1/1993 | Smith ..................................... 451/1 X |
| 5,361,547 | 11/1994 | Church et al. .............................. 451/5 |
| 5,494,473 | 2/1996 | Dupuis et al. .............................. 451/1 |
| 5,597,340 | 1/1997 | Church et al. .............................. 451/5 |

*Primary Examiner*—Timothy V. Eley
*Attorney, Agent, or Firm*—Westman, Champlin & Kelly, P.A.

[57] ABSTRACT

An electrical lap guide (ELG) system and method are disclosed for use in lapping a bar 10 of magnetic transducer carrying sliders to a desired transducer height. A first ELG ELG1 contained within the bar has at least two first ELG resistive elements $R_{11}$ and $R_{12}$. A second ELG ELG 2 contained within the bar has at least two second ELG resistive elements $R_{21}$ and $R_{23}$. A first of the at least two first ELG resistive elements is electrically coupled to a first of the at least two second ELG resistive elements to thereby reduce a total number of leads needed between a data acquisition unit 100 and the bar 10 during lapping. The reduction in required data acquisition unit 100 leads allow more ELGs to be included on each bar 10 in order to more accurately control the lapping process.

13 Claims, 9 Drawing Sheets

|  | APPLY CURRENT ACROSS LEADS | READ VOLTAGE BETWEEN LEADS | CALCULATE RESISTANCE OF RESISTOR |
|---|---|---|---|
| AT START OF LAPPING | $L_{11}, L_{13}$ | $L_{14}, L_{16}$ | $R_{12}$ |
|  | $L_{15}, L_{23}$ | $L_{24}, L_{26}$ | $R_{22}$ |
|  | $L_{25}, L_{33}$ | $L_{34}, L_{36}$ | $R_{32}$ |
|  | ⋮ | ⋮ | ⋮ |
|  | $L_{(N-1)5}, L_{N3}$ | $L_{N4}, L_{N6}$ | $R_{N2}$ |
| DURING LAPPING | $L_{11}, L_{15}$ | $L_{12}, L_{14}$ | $R_{11}$ |
|  |  | $L_{14}, L_{16}$ | $R_{13}$ |
|  | $L_{15}, L_{25}$ | $L_{16}, L_{24}$ | $R_{21}$ |
|  |  | $L_{24}, L_{26}$ | $R_{23}$ |
|  | $L_{25}, L_{35}$ | $L_{26}, L_{34}$ | $R_{31}$ |
|  |  | $L_{34}, L_{36}$ | $R_{33}$ |
|  | ⋮ | ⋮ | ⋮ |
|  | $L_{(N-1)5}, L_{N5}$ | $L_{(N-1)6}, L_{N4}$ | $R_{N1}$ |
|  |  | $L_{N4}, L_{N6}$ | $R_{N3}$ |

TOTAL LEADS REQUIRED = $2(2N+1)$

*Fig. 5*

Fig. 7
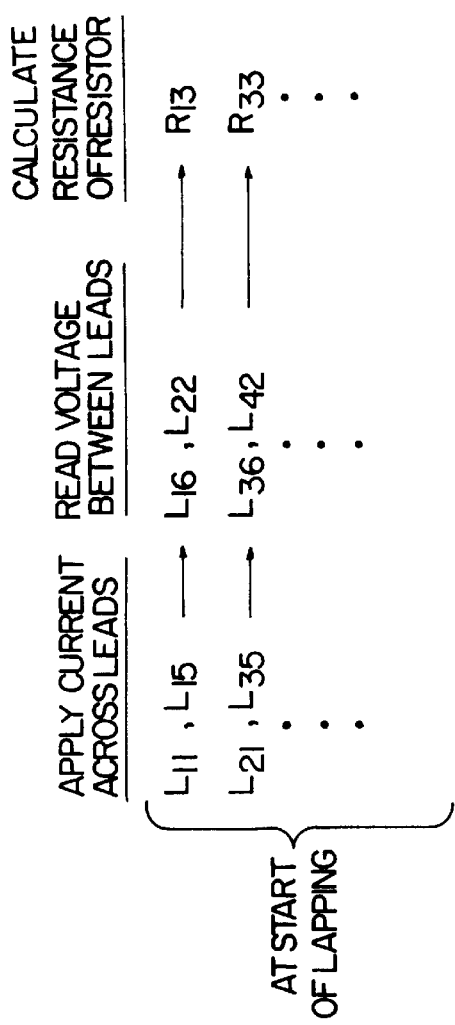
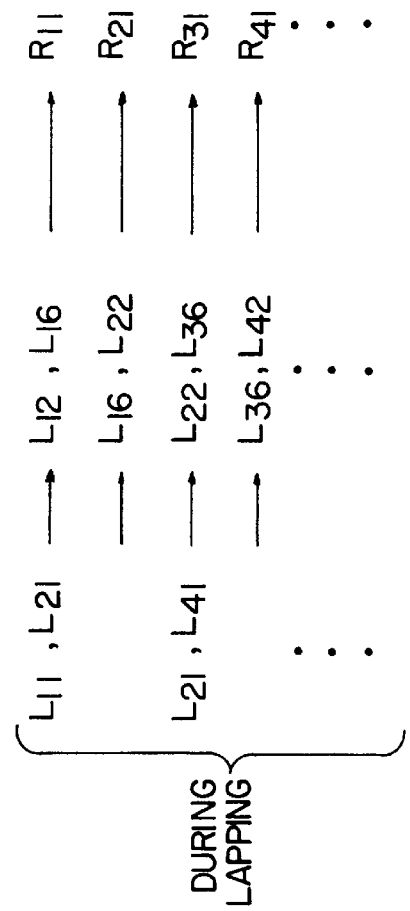

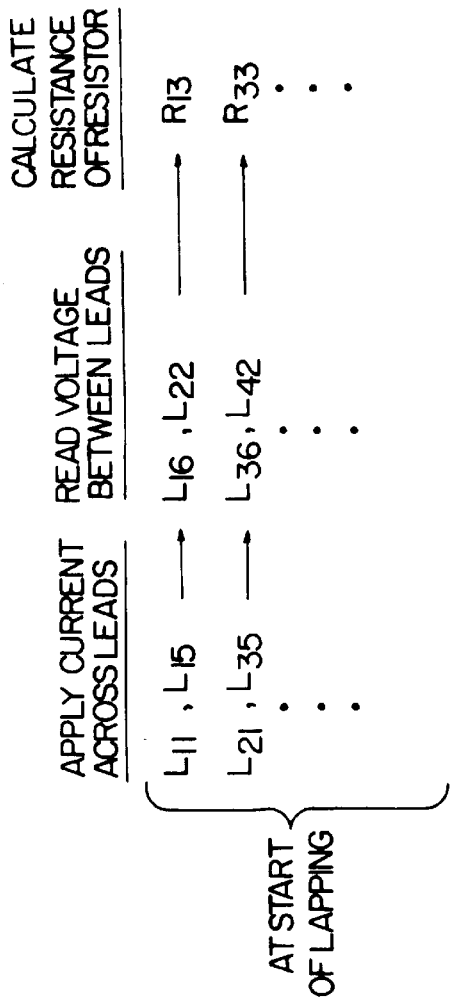
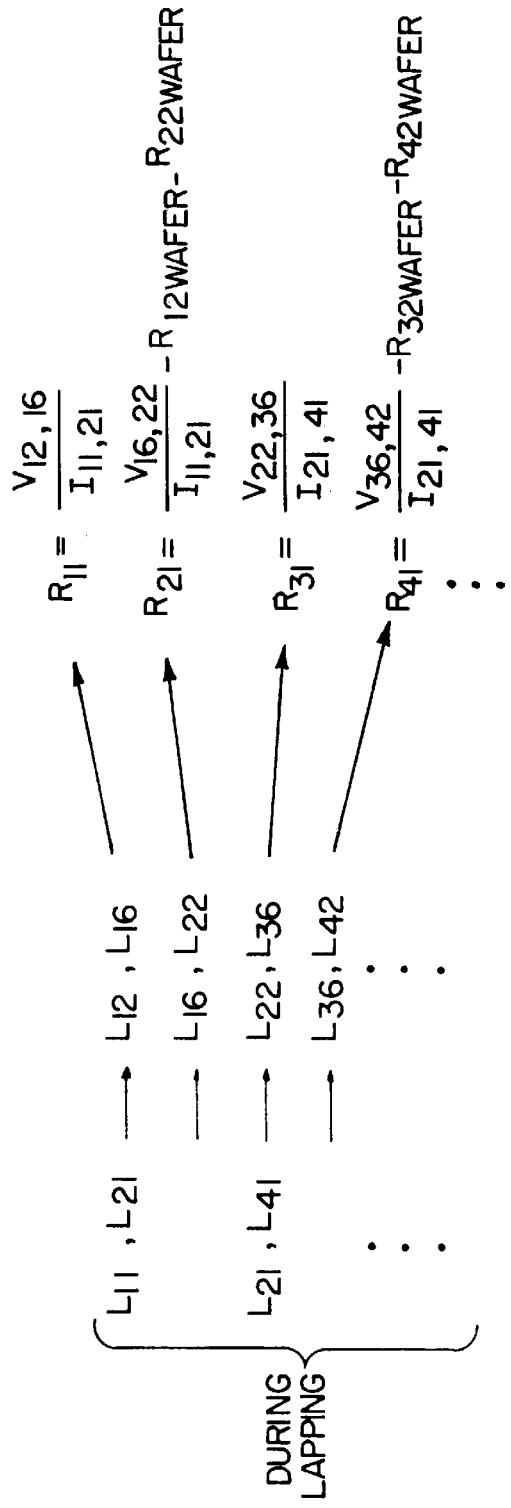
Fig. 9

ELECTRICAL LAP GUIDE WIRING CONFIGURATION

CROSS-REFERENCE TO RELATED APPLICATION

This application claims priority from U.S. Provisional application Ser. No. 60/029,327, which was filed on Oct. 29, 1996 and is entitled ELG WIRING SCHEMES.

The present application herein incorporates by reference co-pending and commonly assigned U.S. patent application Ser. No. 08/629,524 now U.S. Pat. No. 5,722,155 to Stover et al. filed on Apr. 10, 1996 and entitled MACHINING GUIDE FOR MAGNETIC RECORDING REPRODUCE HEADS, and co-pending and commonly assigned U.S. patent application Ser. No. 08/738,693 now U.S. Pat. No. 5,755,612 to Schaenzer et al filed on Oct. 28, 1996 and entitled SMALL FOOT MACHINING GUIDE FOR RECORDING HEADS.

BACKGROUND OF THE INVENTION

The present invention relates generally to the batch fabrication of sliders which carry magnetoresistive (MR) and/or inductive transducers for data storage applications. More particularly, the present invention relates to an improved electrical lap guide (ELG) wiring configuration which allows more ELGs to be included on a row or bar of transducers to be machined, and which reduces the number of electrical connections needed between the bar and the lapping machine for a given number of ELGs on the bar.

During the fabrication of magnetic transducer carrying sliders for use in magnetic data storage systems, an array of sliders is fabricated on a common substrate in a deposition of metallic and nonmetallic layers. Typically, resistive or other elements which cooperatively function as electrical lap guides (ELGs) are also fabricated in the deposition of layers for use in lapping or machining the sliders. ELGs of various types are well known in the art. See for example, U.S. Pat. No. 5,023,991 entitled ELECTRICAL GUIDE FOR TIGHT TOLERANCE MACHINING which issued to Alan Smith on Jun. 18, 1991.

Patterning of the sliders (including the magnetic transducers) and ELGs is accomplished using photolithography in combination with etching and lift-off processes. The finished wafer is then optically and electrically inspected and subsequently cut into smaller arrays, known as rows or bars. Next, the individual bars of sliders are machined, at a surface which will eventually face the recording medium (i.e., the air bearing surface or ABS), to obtain a desired MR transducer height (sometimes referred to as the stripe height SH) or to obtain a desired inductive transducer height (sometimes referred to as the throat height TH).

During machining or lapping of a particular bar of transducers and ELGs, the machined surface moves from a beginning position to a final position, while reducing the height of the transducers. The primary function of the one or more ELGs located on the bar is to control the machining process such that the desired transducer height is achieved. After a particular bar of sliders is machined to the desired transducer height as controlled by the ELGs, the bar is cut or diced into individual sliders. During this process, the ELGs can be destroyed if desired since the purpose for which they exist has been accomplished.

Typically, each ELG includes one or more resistive elements which are fabricated in the deposition of layers along with the sliders. A very simple ELG design has one resistor which is aligned with a transducer such that the machining process reduces the height of both the transducer and the resistor at the same time. The resistance of the machined resistor (frequently referred to as the analog resistor) is monitored to determine when the desired height of the transducer has been achieved so that the machining process can be halted at this point. More common ELG designs include at least two resistive components, one machined (analog) and typically one or two non-machined reference resistors. Two or three resistor ELG's require at least three electrical access terminals on a surface of the bar in order to monitor the resistance of the ELG resistors. In some ELG designs, the resistance of each of the reference resistors is measured prior to lapping and used to calculate the local sheet resistance Q for the bar. The resistance of the machined resistor is compared to the constant resistance of one of the reference resistors during the machining process. When the resistance of the machined resistor equals the resistance of the reference resistor, the machining process is halted, presumably at the point where the height of the machined resistor is approximately equal to the desired transducer height. Sheet resistance Q is used to compensate the calculations for feature size variation, sometimes referred to as edge movement.

As the data storage industry is continuously driven to lower machining costs, there has been a steady demand for higher output (i.e., the number of sliders/transducers per wafer, and thus per bar). This increased bar densification leads to thinner and more flexible bars with more sliders per bar. The bar stiffness bears a cubic relationship to the bar thickness. At the same time, the sensor height machining tolerance for new higher density transducers has been steadily tightened. In order to meet these requirements, it is imperative that more individual ELGs be included on each bar to guide the lapping process so that sensor height can be more accurately controlled. However, the need for more ELGs is in direct conflict with the requirement that more sliders be placed on each bar.

The biggest single impediment to placing more ELGs on each bar of sliders is the space required for electrical connections needed for accessing the ELG components. Typically, for a two or three element ELG, three electrical connections (sometimes referred to as terminals, pads, or studs) are required. Also, as the number of electrical terminals on each bar increases due to an increased number of ELGs per bar, the number lead wires needed to access the ELG components increases significantly. Frequently, lapping system data acquisition units (DAUs) treat each ELG as individual sets of components. Therefore, for each three terminal ELG on the bar, the lapping system requires three leads for passing current through the ELG components, and three leads for sensing voltage drops across the ELG components. Thus, for a three resistor ELG, current ELG wiring schemes require 6 N (where N is equal to the number of ELG's per bar) leads between the DAU and the bar or work piece. As the number of ELGs included in each bar is increased, the scale factor of 6 imposes significant increases in cost and complexity to the DAU in electrical connection related implementation (i.e., the DAU channels, cable size, flex-circuit density, wire-bonds, and carrier size) . Consequently, an ELG system which overcomes or minimizes the effect of these limitations would be a significant improvement in the art.

SUMMARY OF THE INVENTION

An electrical lap guide (ELG) system and method are disclosed for use in lapping a bar of magnetic transducer carrying sliders to a desired transducer height. A first ELG contained within the bar has at least two first ELG resistive elements. A second ELG contained within the bar has at least two second ELG resistive elements. A first of the at least two first ELG resistive elements is electrically coupled to a first of the at least two second ELG resistive elements to thereby reduce a total number of leads needed between a data acquisition unit and the bar during lapping. The reduction in required data acquisition unit leads allow more ELGs to be included on each bar in order to more accurately control the lapping process.

In the ELG system, the first ELG includes at least three first ELG electrical terminals coupled to the at least two first ELG resistive elements for providing electrical access to the at least two first ELG resistive elements. The second ELG also includes at least three second ELG electrical terminals coupled to the at least two second ELG resistive elements for providing electrical access to the at least two second ELG resistive elements. In preferred embodiments, a first of the at least three first ELG electrical terminals is connected to a first of the at least three second ELG electrical terminals to thereby electrically couple the first of the at least two first ELG resistive elements to the first of the at least two second ELG resistive elements. However, in some embodiments, the first of the at least three first ELG electrical terminals also functions as the first of the at least three second ELG electrical terminals to thereby reduce a total number of terminals positioned on a surface of the bar.

In preferred embodiments, ELG system of the present invention includes a total of N ELGs contained within the bar, with each of the N ELGs having at least two resistive elements. A first resistive element of substantially each of the N ELGs is connected to a first resistive element of the adjacent one of the N ELGs to thereby reduce a total number of data acquisition unit leads needed between the data acquisition unit and the bar to determine the resistances of each of the resistive elements of each of the N ELGs to a number substantially no greater than the number represented by the expression 4N+2.

In more particular embodiments of the present invention, the at least two ELG resistive elements for each of the N individual ELGs are connected to each other at a corresponding one of N nodes located within the bar and associated with the particular ELG. The ELGs are paired by connecting the node associated with each ELG to the node associated with another ELG during lapping. The ELGs can be connected in this manner to reduce the total number of data acquisition unit leads needed between the data acquisition unit and the bar to determine the resistances of each of the resistive elements of each of the N ELGs to a number substantially no greater than a number represented by the expression 2N+2.

BRIEF DESCRIPTION OF THE DRAWINGS

FIG. 5 is a table illustrating the manner in which the 2(2N+1) lapping system DAU lead wires can be used to access the ELG resistors on a bar utilizing a three resistor ELG design with the benefit of the wiring scheme illustrated in FIG. 5.

FIG. 7 is a table illustrating the manner in which the 2(N+1) lapping system DAU lead wires can be used to access the ELG resistors on a bar utilizing a three resistor ELG design with the benefit of the wiring scheme illustrated in FIG. 6.

FIG. 9 is a table illustrating the manner in which the 2(N+1) lapping system DAU lead wires can be used to access the ELG resistors on a bar utilizing a three resistor ELG design with the benefit of the wiring scheme illustrated in FIG. 8.

DETAILED DESCRIPTION OF THE PREFERRED EMBODIMENTS

Figure 1:
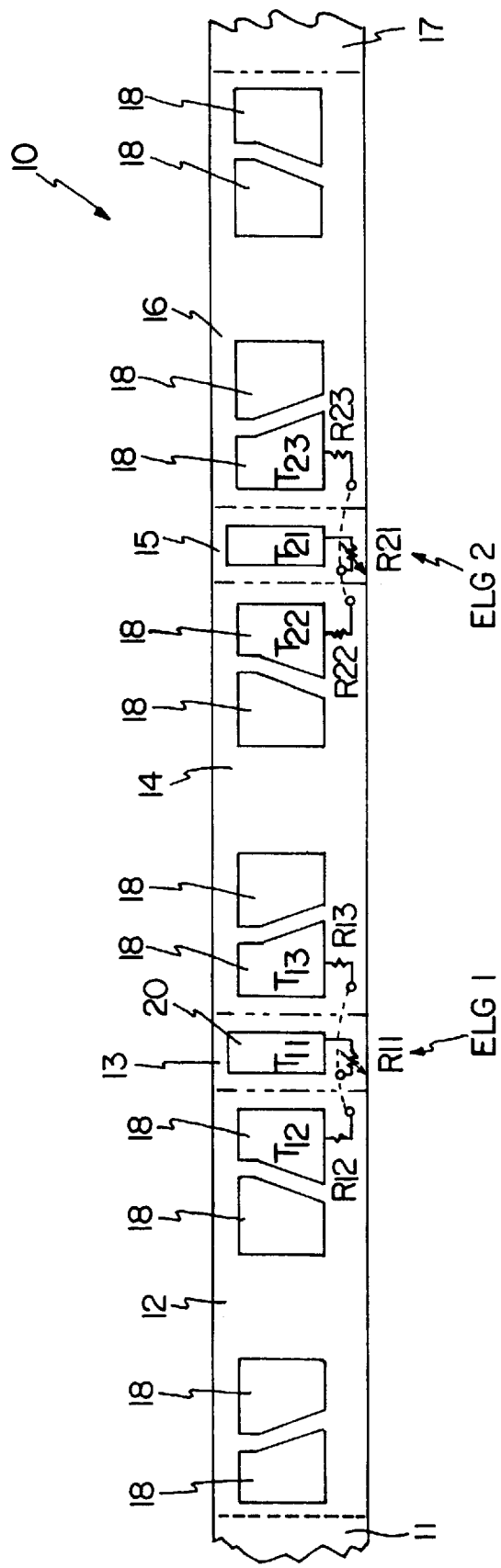
FIG. 1 is a diagrammatic view of a bar of magnetic transducer carrying sliders which includes a number of three resistor ELGs for use in controlling the lapping or machining process and which can be configured in accordance with preferred embodiments of the present invention to reduce the number of lead wires needed between the bar and the lapping system DAU.

FIG. 1 illustrates bar 10 of magnetic transducer carrying sliders and ELGs. The ELG wiring schemes of the present invention can be used to reduce the total number of lead wires necessary between the lapping system DAU (shown in FIGS. 2, 4, 6 and 8) and bar 10. Reducing the number of lead wires makes it possible to include more ELGs on each bar to better control the machining process.

Bar 10 includes a large number of sliders (only sliders 12, 14 and 16 are shown) separated by dice lanes (only dice lanes 11, 13, 15 and 17 are shown). Each of the N ELGs (only ELG1 and ELG2 are shown in FIG. 1) on bar 10 has three resistors, $R_{N1}$, $R_{N2}$ and $R_{N3}$. For sake of clarity, it must be understood that N is used herein as a designator for each individual ELG. For example, ELG2 actually includes resistors $R_{21}$, $R_{22}$ and $R_{23}$. In some preferred embodiments, resistor $R_{N1}$ of each ELG is an analog resistor exposed to the machined surface, and resistors $R_{N2}$ and $R_{N3}$ of each ELG are reference resistors used for either comparison to the resistance of analog resistors $R_{N1}$ during machining, or for the computation of sheet resistance Q of the bar.

Placing at least one resistor of each ELG in a dice lane, while the other resistors of each ELG are placed within the sliders adjacent the dice lane, reduces the space required for each ELG. While this configuration is a preferred configuration, the present invention can be used with any of a wide variety of ELG designs having at least two resistors per ELG.

To access the resistors of a two or three resistor ELG, at least three electrical access terminals are required. As illustrated in FIG. 1, each ELG on bar 10 includes electrical access terminal $T_{N1}$ connected to resistor $R_{N1}$, access terminal $T_{N2}$ connected to resistor $R_{N2}$, and access terminal $T_{N3}$ connected to resistor $R_{N3}$. In some embodiments, access terminals $T_{N2}$ and $T_{N3}$ of each ELG are implemented using bond pads 18, on the surface of each slider, which also function to provide access to the MR or inductive transducers located on the sliders. After machining bar 10 to the desired height using the ELGs located on the bar, bar 10 is diced into individual sliders. During the dicing process, the dice lanes are destroyed and resistors $R_{N2}$ and $R_{N3}$ of each ELG remain in the corresponding sliders, but have no further use. However, in other possible ELG designs, all of the resistors are located in dice lanes or in sliders, but not in both.

Figure 2:
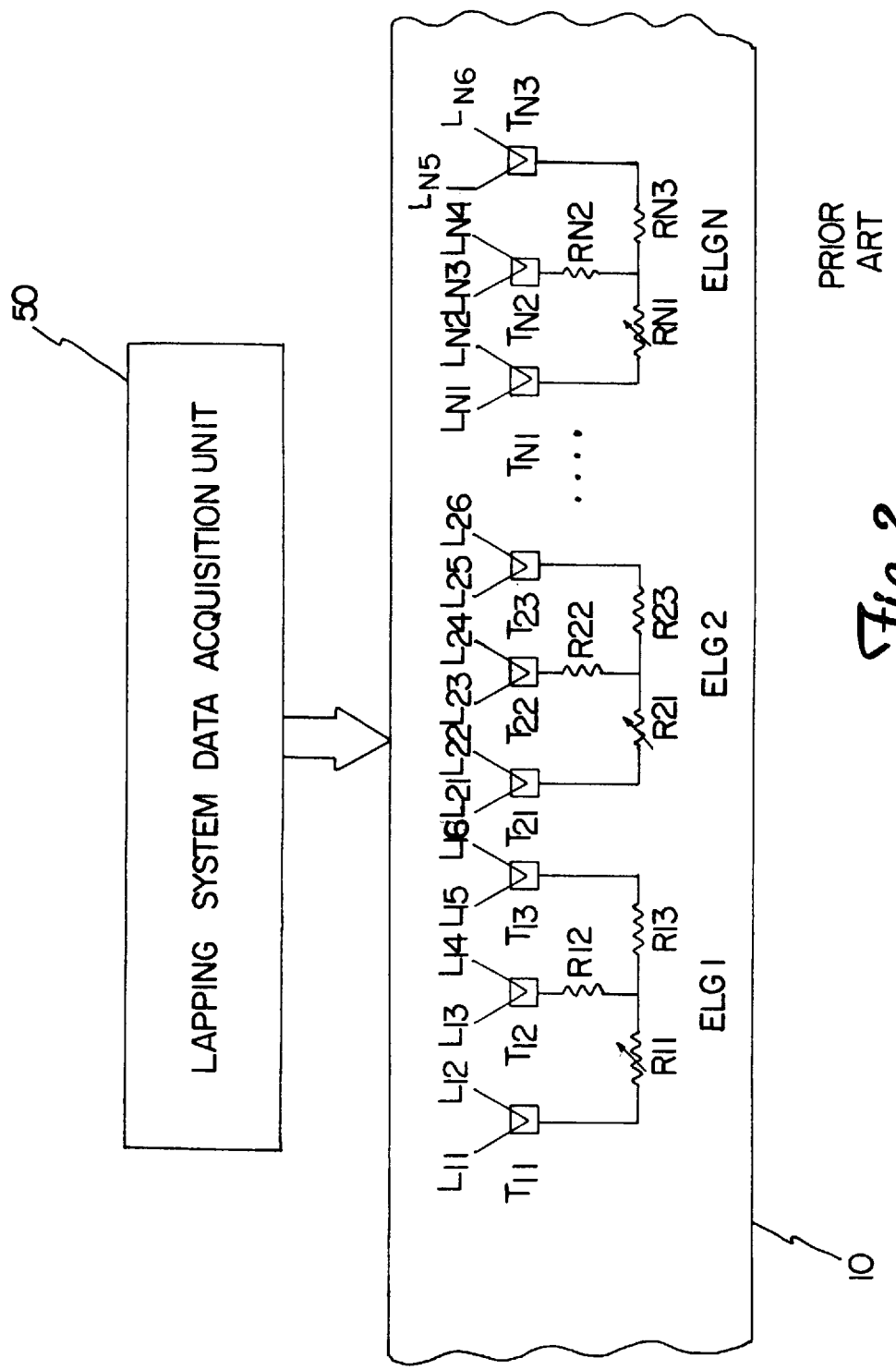
FIG. 2 is schematic view illustrating the 6 N lead wires typically necessary to couple the N ELGs on the machined bar to the lapping system DAU.

FIG. 2 illustrates the connections required between lapping system DAU 50 and the resistors of N ELGs on a bar of sliders to be machined. Typically, lapping system DAUs treat each ELG as an individual set of components, separate from the components of other ELGs on the bar. Thus, lapping system DAU 50 requires three leads $L_{N1}$, $L_{N3}$ and $L_{N5}$ for each of the N ELGs on bar 10 in order to selectively pass current through the ELG resistors. Lapping system DAU 50 also requires three leads $L_{N2}$, $L_{N4}$ and $L_{N6}$ for sensing voltage across the ELG components. Thus, lapping system DAUs require six leads for each ELG in conventional ELG wiring schemes. As an example, for a bar containing 14 three terminal ELGs, the DAU will require 84 total leads, 14 sets of three leads for passing current through the resistors of the 14 individual ELGs, and 14 sets of three leads for sensing voltage across the resistors of the 14 individual ELGs.

Figure 3:
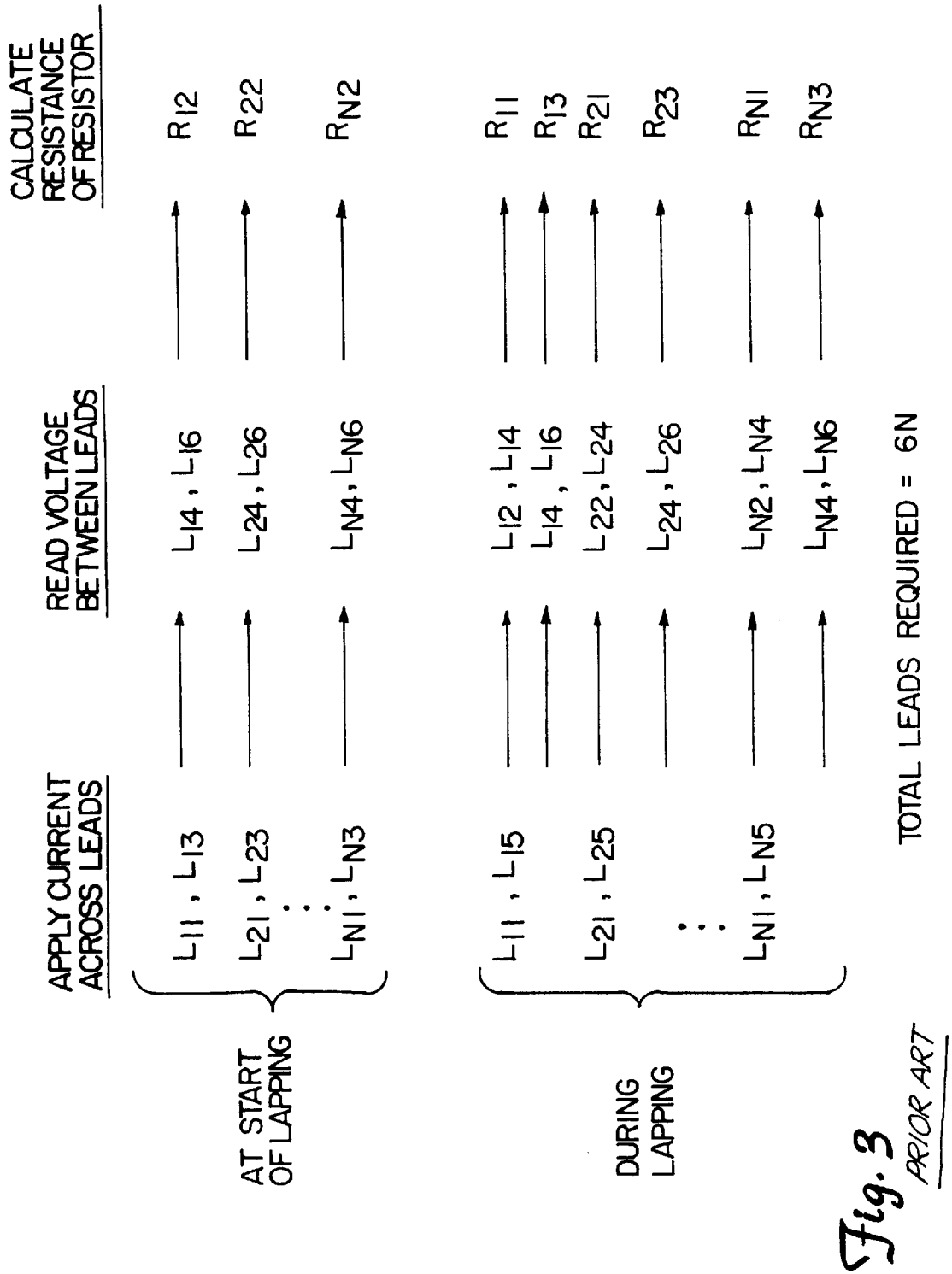
FIG. 3 is a table illustrating the manner in which the 6 N lapping system DAU lead wires can be used to access the ELG resistors on a bar utilizing a three resistor ELG design without the benefit of the present invention.

FIG. 3 is a table which illustrates the manner in which a lapping system DAU having six leads per ELG can be used to control the lapping process for a bar having a conventional ELG wiring scheme. At the start of lapping, current is applied across leads $L_{N1}$ and $L_{N3}$ for each of the N ELGs on the bar (e.g. across lead wires $L_{11}$ and $L_{13}$ of ELG1). Simultaneously, the voltages is sensed across leads $L_{N4}$ and $L_{N6}$ for each of the N ELGs on the bar (e.g., across leads $L_{14}$ and $L_{16}$ for ELG1). Using the current and sensed voltage values, resistor $R_{N2}$ for each ELG (e.g., $R_{22}$ for ELG2) can be calculated prior to or at the start of lapping. During lapping, current is applied across leads $L_{N1}$ and $L_{N5}$ (e.g., lead wires $L_{11}$ and $L_{15}$ for ELG1) while the voltage is sensed between leads $L_{N2}$ and $L_{N4}$ (e.g., leads $L_{12}$ and $L_{14}$ for ELG1) and between leads $L_{N4}$ and $L_{N6}$ (e.g., leads $L_{14}$ and $L_{16}$ for ELG1) for each ELG. These currents and voltages are used to calculate the resistances of resistors $R_{N1}$ and $R_{N3}$ (e.g., leads $R_{11}$ and $R_{13}$ of ELG1) of each ELG.

As more and more ELGs are needed to guide the lapping process, the scale factor of six leads per ELG imposes significant lapping system costs and limitations. The wiring schemes illustrated in FIGS. 4, 6 and 8 require fewer DAU leads per ELG, and thus allow more ELGs per to be included on each bar without increasing the number of leads required. The only hardware changes required to a typical lapping system DAU are related to relay switching logic for four-wire resistance measurement control.

Figure 4:
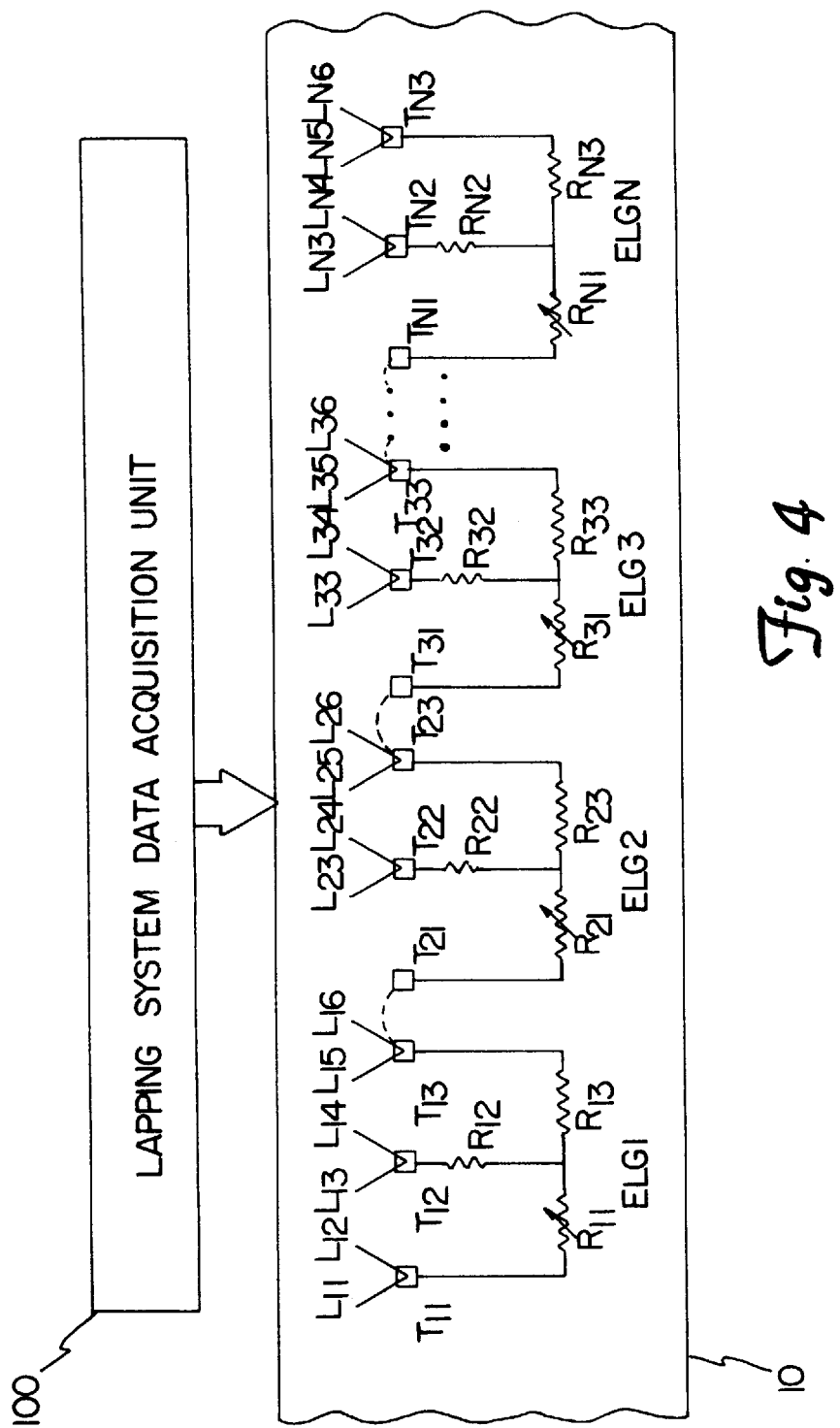
FIG. 4 is a schematic view illustrating a first wiring scheme in accordance with preferred embodiments of the present invention which reduces to 2(2N+1) the number of lead wires needed between the lapping system DAU and the bar to access the resistors of N three resistor ELGs.

FIG. 4 illustrates an ELG wiring scheme or configuration, in accordance with the preferred embodiments of the present invention, which reduces the leads or connections required between the lapping system DAU and the resistors of the N ELGs on a bar of sliders. As was the case in FIG. 2, each of the N ELGs included in bar 10 in the configuration illustrated in FIG. 4 is a three resistor ELG. However, a new wiring configuration between ELGs reduces the total number of lead wires necessary between lapping system DAU 100 and bar 10.

As can be seen in the ELG wiring configuration illustrated in FIG. 4, at least one access terminal of each of the N ELGs on the bar is electrically connected to an access terminal on an adjacent ELG. As illustrated, access terminal $T_{13}$ of ELG1 is connected to access terminal $T_{21}$ of adjacent ELG2. In general, for ELGs other than ELG1 and ELGN, terminal $TN_1$ is coupled terminal $T_{(N-1)3}$, while terminal $T_{N3}$ is coupled to terminal $T_{(N+1)1}$. The connected access terminals for adjacent ELGs can be coupled together using either wire bonding at the surface of bar 10, or using wafer processing steps to connect the corresponding resistors internally within bar 10. Of course, if the connection is made internal to bar 10, one of the two connected access terminals can be eliminated altogether from the surface of bar 10. In either case, the leads from lapping system DAU 100 normally coupled to one of the two access terminals can be eliminated.

FIG. 5 is a table which illustrates the manner in which lapping system DAU 100 is used to control the lapping process for a bar having the wiring scheme illustrated in FIG. 4. At the start of lapping, the resistances of reference resistor $R_{12}$ of ELG1 is calculated by applying current across leads $L_{11}$ and $L_{13}$ (i.e. across terminals $T_{11}$ and $T_{13}$ of ELG1) and by reading the voltage across leads $L_{14}$ and $L_{16}$. For each of the remaining ELGs, the resistance of resistors $R_{N2}$ are calculated by applying current across leads $L_{(N-1)5}$ and $L_{N3}$ and by reading the voltage across leads $L_{N4}$ and $L_{N6}$. During lapping, resistances of resistors $R_{11}$ and $R_{13}$ of ELG1 are calculated and monitored by applying current across leads $L_{11}$ and $L_{15}$ and by sensing the voltages across leads $L_{12}$ and $L_{14}$ and between leads $L_{14}$ and $L_{16}$. In order to monitor the resistances of resistors $R_{N1}$ and $R_{N3}$ of each of the remaining ELGs, current is applied across leads $L_{(N-1)5}$ and $L_{N5}$ while sensing voltage across leads $L_{(N-1)6}$ and $L_{N4}$ and between leads $L_{N4}$ and $L_{N6}$.

Sharing leads among adjacent ELGs in the manner illustrated in FIG. 4 requires a total of 2(2N+1) leads to connect the N ELGs to lapping system DAU 100. Thus, with the total number of leads between the lapping system DAU and the bar previously being a limiting factor, an increase in the total number of ELGs on bar 10 can be achieved. The wiring scheme or configuration illustrated in FIG. 4 allows on-line independent measurements of three components for each ELG. Initial measurements of the references resistors $R_{N2}$ and $R_{N3}$ of each ELG are used to calculate local sheet resistance Q, which is in turn combined with measurement of resistor $R_{N1}$ (the exposed and machined resistor of each ELG) to estimate the transducer height during lapping. The transducer height estimation is insensitive to feature size variation (edge movement) caused by wafer processing. Continuously monitoring each of reference resistors $R_{N3}$ allows compensation for resistance measurement variation caused by thermal effects or other sources during lapping. The links shown in FIG. 4 among adjacent ELGs are preferably simply implemented by wire-bonding.

It is possible to calculate local sheet resistance Q with only one reference resistor using the following resistance equation given that $W_{REF} \gg \Delta$.

$$R_{REF} = \frac{QL_{REF}}{W_{REF} - \Delta} \approx \frac{QL_{REF}}{W_{REF}} \qquad \text{Equation 1}$$

Where, $L_{REF}$=length of the reference resistor;

$W_{REF}$=width of the reference resistor; and $\Delta$=quantity of edge movement.

Calculations based on wafer-probed data indicate that difference between Q calculated using two reference resistors (i.e. $R_{N2}$ and $R_{N3}$) and Q calculated using only one reference resistor is less than 0.5%. Also, calculations based on wafer-probed data shows a smooth variation of Q across bars, with the variation in magnitude of Q for each bar being typically less than 2%. As bar densification increases (i.e., more sliders and ELGs are included per bar), it is unnecessary to estimate Q for each ELG. A local Q can be calculated and shared among adjacent ELGs.

Figure 6:
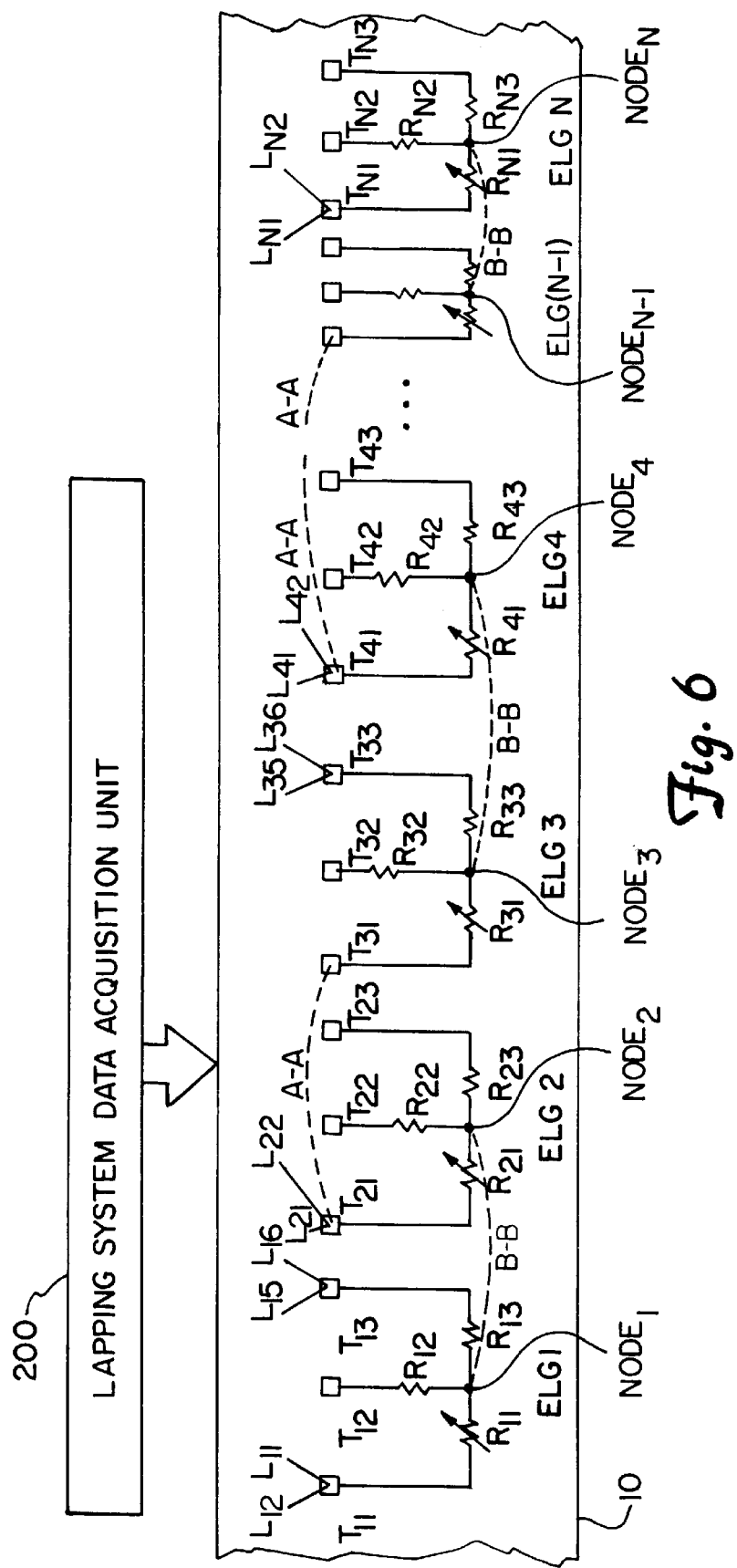
FIG. 6 is a schematic view illustrating a second wiring scheme in accordance with preferred embodiments of the present invention which reduces to 2(N+1) the number of lead wires needed between the lapping system DAU and the bar to access the resistors of N three resistor ELGs.

FIGS. 6 and 7 illustrate an ELG wiring configuration and measurement scheme based upon the above discussion. Each of the N ELGs on bar 10 is paired-up or coupled to one adjacent ELG through wafer links B—B at the node connecting the three resistors of each ELG. In other words, $NODE_1$, of ELG1 is connected via a wafer link to $NODE_2$ of ELG2. The remaining ELGs on bar 10 are connected in pairs in the same manner. Also, one terminal of each ELG is connected to the corresponding terminal on the adjacent ELG with which it is not paired. In other words, as illustrated by way of example in FIG. 6, while ELG2 is paired with ELG1 via a wafer link B—B between NODE1 and NODE2, access terminal $T_{21}$ of ELG2 is coupled to access terminal $T_{31}$ of ELG3. As can be seen in FIG. 6, this ELG wiring configuration requires only the 2(N+1) leads between lapping system DAU 200 and bar 10 for N ELGs.

FIG. 7 is a table which illustrates the manner in which lapping DAU 200 is used to control the lapping process for a bar having the ELG wiring configuration illustrated in FIG. 6. At the start of lapping, local sheet resistance Q is calculated from initial measurements of one reference resistor for each pair of ELGs. For instance, resistor $R_{13}$ is calculated by applying current across leads $L_{11}$ and $L_{15}$ and sensing voltage across between leads $L_{16}$ and $L_{22}$. Likewise, for the next pair of ELGs, resistor $R_{33}$ is calculated by applying current across leads $L_{21}$ and $L_{35}$ while sensing voltage leads across $L_{36}$ and $L_{42}$. Measurement of this reference resistor for each pair of ELGs is used to calculate sheet resistance Q for the pair.

During lapping, analog resistor $R_{N1}$ for each of the N ELGs monitored. For example, by applying current across leads $L_{11}$ and $L_{21}$ and sensing voltage between leads $L_{12}$ and $L_{16}$, the resistance of resistor $R_{11}$ can be calculated and monitored. Likewise, by applying current across leads $L_{11}$ and $L_{21}$ while reading the voltage between leads $L_{16}$ and $L_{22}$, the resistance of resistor $R_{21}$ can be calculated and monitored. The local sheet resistance Q for each pair is combined with the continuous measurement during lapping of individual machined resistors $R_{N1}$ for each of the N ELGs in order to estimate the height using each ELG.

One advantage of including three resistors per ELG even with the wiring configuration illustrated in FIG. 6 is that the integrity of individual ELGs can be verified for wafer level ELG reliability testing. Wafer-probed resistances of resistors $R_{N2}$ and $R_{N3}$ can be used to predict the resistance of $R_{N1}$ for each of the N ELGs with the consideration of feature size variation, and then compared to the actual measured value of resistance $R_{N1}$ for the corresponding ELG to detect the existence of possible non-functioning ELGs. A significant difference in the calculated and measured resistances of a resistor $R_{N1}$ for a particular ELG is indicative of the ELG being non-functioning.

Electrical connections or links denoted A—A and shown in FIG. 6 can be implemented by wire-bonding. Electrical connections or links denoted B—B for connecting the junctions of the resistors to form ELG pairs preferably is accomplished using wafer processing. However, VIAS can be built over these junctions (i.e. over $NODE_N$ for each of the N ELGs). Then, shared pole plated NiFe or upper pole plated NiFe can be used to form the links internally on the wafer. The links would then either run under or over the coils of any inductive write transducers in each slider. Also, studs or terminals connected to these nodes or junctions can be added such that wire-bonding can be used to form links B—B externally on bar 10.

Figure 8:
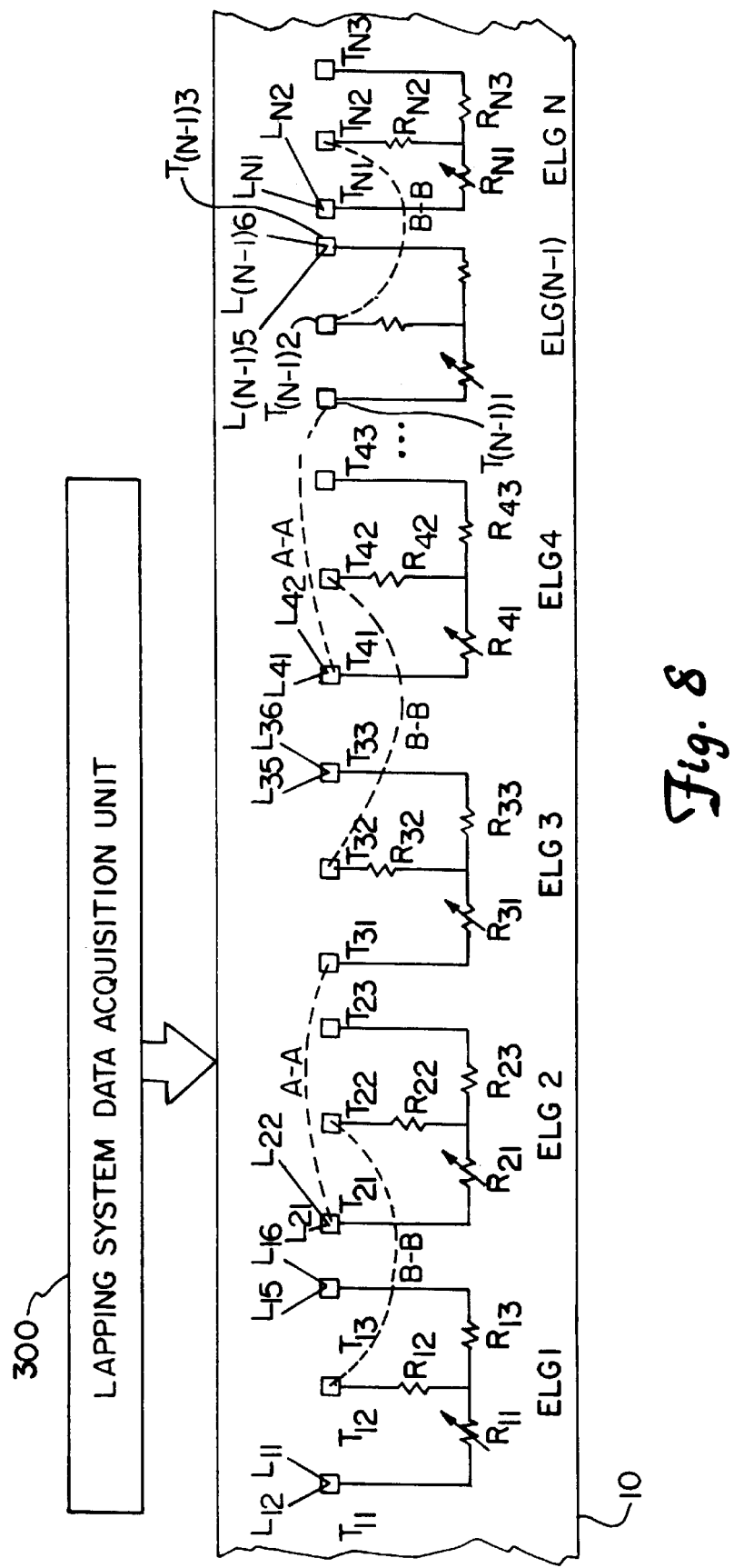
FIG. 8 is a schematic view illustrating a third wiring scheme in accordance with preferred embodiments of the present invention which reduces to 2(N+1) the number of lead wires needed between the lapping system DAU and the bar to access the resistors of N three resistor ELGs.

FIG. 8 illustrates an ELG wiring configuration similar to the configuration illustrated in FIG. 6, but which can be implemented without wafer modification. Links B—B between pairs of adjacent ELGs are established using the terminals connected to resistors $R_{N2}$ for each ELG (i.e., terminal $T_{12}$ and $T_{22}$ for ELG1 and ELG2). Thus, both links denoted A—A and links denoted B—B are formed externally by wire-bonding. However, this wiring configuration requires feeding forward wafer probed $R_{N2}$ readings in order to calculate resistances of resistors $R_{N1}$ (i.e., $R_{21}$, $R_{41}$, $R_{61}$). This is illustrated in the table of FIG. 9. Like the wiring configuration illustrated in FIG. 6, the wiring configuration illustrated in FIG. 8 requires a total of 2(N+1) leads between lapping system DAU 300 and bar 10).

Although the present invention has been described with reference to preferred embodiments, workers skilled in the art will recognize that changes may be made in form and detail without departing from the spirit and scope of the invention.

What is claimed is:

1. In combination with a bar of magnetic transducer carrying sliders, an electrical lap guide (ELG) system for use in lapping the bar to a desired transducer height, the ELG system comprising:

a first ELG contained within the bar and having at least two first ELG resistive elements; and a second ELG contained within the bar and having at least two second ELG resistive elements, wherein a first of the at least two first ELG resistive elements is electrically coupled to a first of the at least two second ELG resistive elements.

2. The ELG system of claim 1, wherein the first ELG further comprises at least three first ELG electrical terminals coupled to the at least two first ELG resistive elements, wherein the second ELG further comprises at least three second ELG electrical terminals coupled to the at least two second ELG resistive elements, and wherein a first of the at least three first ELG electrical terminals is connected to a first of the at least three second ELG electrical terminals to thereby electrically couple the first of the at least two first ELG resistive elements to the first of the at least two second ELG resistive elements.

3. The ELG system of claim 2, wherein the first of the at least three first ELG electrical terminals also functions as the first of the at least three second ELG electrical terminals to thereby reduce a total number of terminals positioned on a surface of the bar.

4. The ELG system of claim 1, wherein the at least two first ELG resistive elements are connected to each other at a first ELG node located within the bar, and wherein the ELG system further comprises a third ELG contained within the bar, the third ELG having at least two third ELG resistive elements positioned within the bar, wherein the at least two third ELG resistive elements are connected to each other at a third ELG node located within the bar, and wherein the first ELG node is coupled to the third ELG node.

5. The ELG system of claim 1, wherein the ELG system further comprises a total of N ELGs contained within the bar, each of the N ELGs contained within the bar having at least two resistive elements, wherein a first resistive element of each of the N ELGs is connected to a first resistive element of an adjacent one of the N ELGs to thereby reduce a total number of data acquisition unit leads needed between a data acquisition unit and the bar to determine the resistances of each of the resistive elements of each of the N ELGs to a number no greater than the number represented by the expression 4N+2.

6. The ELG system of claim 5, wherein for each of the N ELGs contained within the bar, the at least two resistive elements are connected to one another at a node associated with the particular ELG, and wherein the node associated with each of the N ELGs is connected to the node associated with another of the N ELGs to thereby reduce the total number of data acquisition unit leads needed between the data acquisition unit and the bar to determine the resistances of each of the resistive elements of each of the N ELGs to a number no greater than a number represented by the expression 2N+2.

7. In combination with a bar of magnetic transducer carrying sliders, a lapping system for use in lapping the bar to achieve a desired transducer height, the lapping system comprising:

a data acquisition unit having current generating and voltage sensing circuitry coupleable through electrical leads to the bar for use in determining resistances of electrical lap guide (ELG) resistors contained within the bar;

N ELGs contained within the bar, wherein each of the N ELGs includes at least two resistive elements and at least three electrical terminals associated with the at least two resistive elements for connecting the at least two resistive elements to the data acquisition unit leads, wherein a first resistive element of each of the N ELGs is connected to a first resistive element of an adjacent one of the N ELGs to thereby reduce a total number of data acquisition unit leads coupled between the data acquisition unit and the bar needed to determine the resistances of each of the resistive elements of each of the N ELGs to a number less than the number represented by the expression 6N.

8. The lapping system of claim 7, wherein the first resistive element of each of the N ELGs is connected to the first resistive element of an adjacent one of the N ELGs to thereby reduce the total number of data acquisition unit leads coupled between the data acquisition unit and the bar needed to determine the resistances of each of the resistive elements of each of the N ELGs to a number no greater than the number represented by the expression 4N+2.

9. The lapping system of claim 8, wherein for each of the N ELGs contained within the bar, the at least two resistive elements are connected to one another at a node associated with the particular ELG, and wherein the node associated with each of the N ELGs is connected to the node associated with another of the N ELGs to thereby reduce the total number of data acquisition unit leads coupled between the data acquisition unit and the bar needed to determine the resistances of each of the resistive elements of the N ELGs to a number no greater than a number represented by the expression 2N+2.

10. In combination with a bar of magnetic transducer carrying sliders, an electrical lap guide (ELG) system for use in lapping the bar to a desired height, the ELG system comprising:

a first ELG contained within the bar, the first ELG comprising:
at least two first ELG resistive elements positioned within the bar; and
at least three first ELG electrical terminals positioned on a surface of the bar, the at least three first ELG electrical terminals being coupled to the at least two first ELG resistive elements for coupling the at least two first ELG resistive elements to external circuitry;

a second ELG contained within the bar, the second ELG comprising:
at least two second ELG resistive elements positioned within the bar; and
at least three second ELG electrical terminals positioned on a surface of the bar, the at least three second ELG electrical terminals being coupled to the at least two second ELG resistive elements for coupling the at least two second ELG resistive elements to external circuitry;

wherein a first of the at least three first ELG electrical terminals is coupled to a first of the at least three second ELG electrical terminals to thereby reduce a total number of leads between the external circuitry and the bar necessary to couple the at least two first ELG resistive elements and the at least two second ELG resistive elements to the external circuitry.

11. The ELG system of claim 10, wherein the first of the at least three first ELG electrical terminals is coupled to the first of the at least three second ELG electrical terminals by a wire bond connection external to the bar of magnetic transducers.

12. The ELG system of claim 10, wherein the first of the at least three first ELG electrical terminals also functions as the first of the at least three second ELG electrical terminals to thereby reduce a total number of electrical terminals positioned on the surface of the bar.

13. The ELG system of claim 10, wherein the at least two first ELG resistive elements are connected to each other at a first ELG node located within the bar, and wherein the ELG system further comprises a third ELG contained within the bar, the third ELG having at least two third ELG resistive elements positioned within the bar, wherein the at least two third ELG resistive elements are connected to each other at a third ELG node located within the bar, and wherein the first ELG node is coupled to the third ELG node during lapping to thereby further reduce the total number of leads between the external circuitry and the bar necessary to couple the at least two first ELG resistive elements, the at least two second ELG resistive elements and the at least two third ELG resistive elements to external circuitry.

* * * * *